INVENTOR
P. W. BARNHART

BY

ATTORNEYS

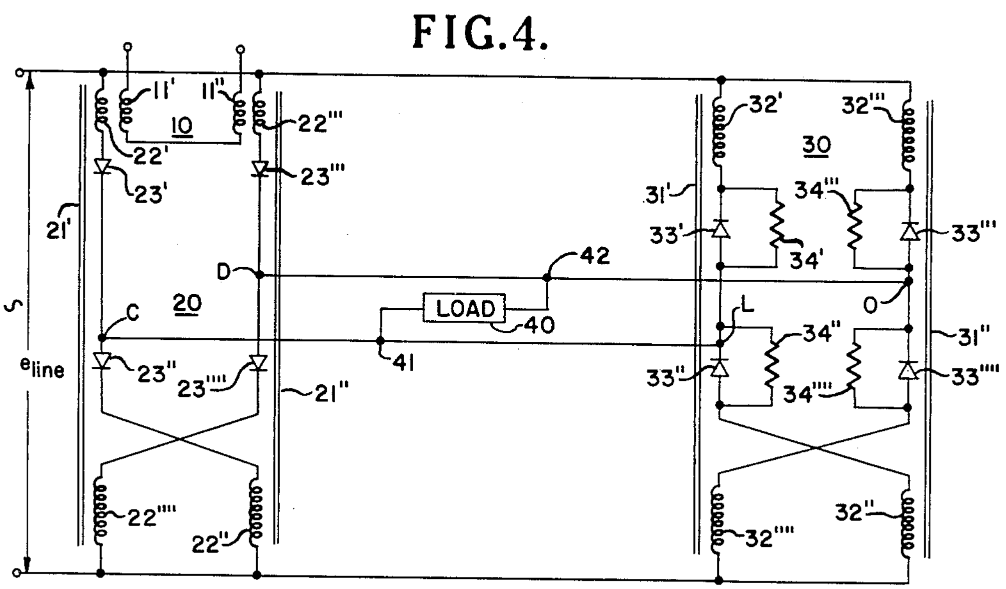
FIG. 5.
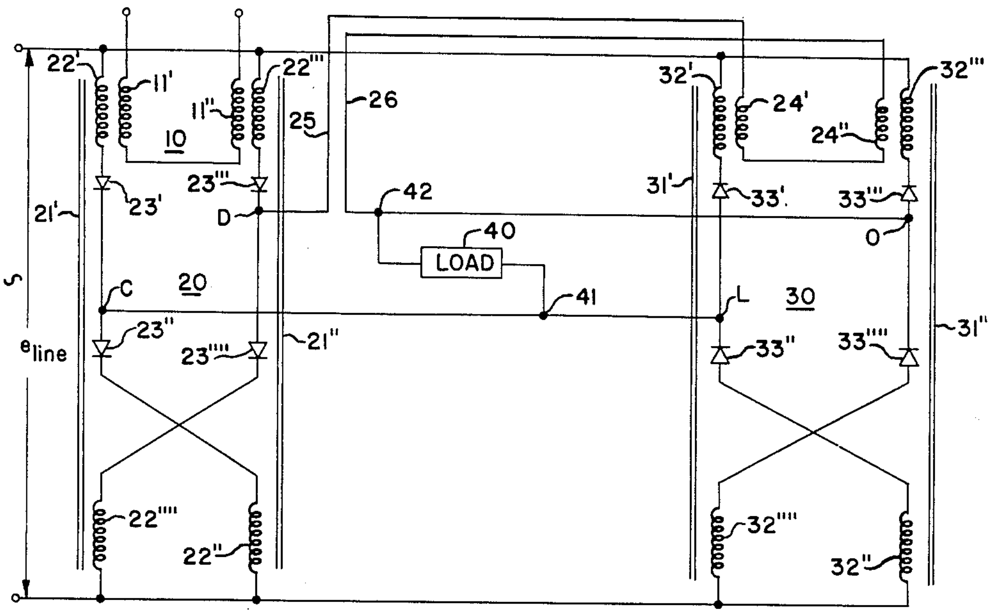
INVENTOR
P. W. BARNHART
BY
ATTORNEYS

July 10, 1956 P. W. BARNHART 2,754,474

ARRANGEMENT FOR PRODUCING FULL-WAVE OUTPUT FROM HALF-WAVE MAGNETIC AMPLIFIERS

Filed April 13, 1955 3 Sheets-Sheet 3

INVENTOR
P. W. BARNHART

BY

ATTORNEYS

United States Patent Office 2,754,474

Patented July 10, 1956

2,754,474

ARRANGEMENT FOR PRODUCING FULL-WAVE OUTPUT FROM HALF-WAVE MAGNETIC AMPLIFIERS

Philip W. Barnhart, University Park, Md., assignor to the United States of America as represented by the Secretary of the Navy Application April 13, 1955, Serial No. 501,218

15 Claims. (Cl. 323—89)

(Granted under Title 35, U. S. Code (1952), sec. 266)

The invention described herein may be manufactured and used by or for the Government of the United States of America for governmental purposes without the payment of any royalties thereon or therefor.

This invention relates to magnetic amplifiers and more particularly pertains to a full-wave magnetic amplifier output stage having half-wave amplifier characteristics.

Those concerned with the development of high performance magnetic amplifier servo systems have long recognized the need for an output stage which would produce a full-wave current output into a servomotor and still retain the two inherent advantages of a half-wave amplifier, namely, the high speed of response and inherent demodulation. The present invention is directed to a new concept in full-wave push-pull output stages which fulfill this need.

As noted earlier in work on half-wave bridge type magnetic amplifiers, the half-wave output therefrom to a servomotor controlled thereby contains a fundamental component which provides considerable torque. However, since this torque is less than rated torque, consideration must be given to this factor when selecting the servomotor, otherwise it will be impossible to obtain a full torque output from the motor even when using a shunt capacitor across the control phase windings. In general, the direct current component causes some loss of torque (about 15%), but saturation effects vary widely from motor to motor. In many instrument servos this problem is not critical, but in other systems a more efficient utilization of the servo motor is desirable.

While a conventional full-wave magnetic amplifier will provide the desired type of control current for a servomotor, it does not provide the two inherent advantages gained by using half-wave amplifier techniques, namely speed of response and inherent demodulation. While much has been claimed about the speed of response of full-wave amplifiers with the relatively low gains used in servo systems, a full-wave magnetic amplifier control system which demonstrates the response of similar system using half-wave amplifiers has not, as yet, been devised. The use of inherent demodulation characteristics to provide system compensation is not readily available when full-wave amplifiers are used. The use of compensation with full-wave amplifiers is usually concerned with improving amplifier response, not system response. Neither of these types of full-wave magnetic amplifiers is the complete answer in the case where it is desirable to have a high performance control system and utilize the servomotor to a maximum.

The ideal solution in this case is a half-wave magnetic amplifier in which the output can be converted to a full-wave voltage applied to the load. A circuit which will store information about the output of the half-wave stage into the load during one half-cycle and produce the same output into the load on the next half-cycle will solve this problem. It must produce a very sensitive output with a minimum of direct current component, or a polarity sensitive direct current.

One attempt of providing a means for producing a full-wave output voltage from a half-wave amplifier was with the flux locking circuit disclosed in the copending application of E. T. Hooper, Serial No. 335,619, filed February 6, 1953, and assigned to the same assignee. In this circuit full-wave output is obtained by lowering the impedance across the control winding on a core of rectangular hysteresis loop material to zero, effectively shorting the core and lowering its impedance to zero for the remainder of the control half-cycle. Line voltage then appears across the load. While the core is shorted, its flux cannot change so that on the next half cycle when the polarity of the applied line voltage is reversed, the flux change from the point at which it locked until it reaches saturation will have the same value as that of the previous half-cycle before it was shorted. The output after saturation should be identical in shape and amplitude but reversed in polarity to the output of the previous half-cycle. Thus a full-wave output is obtained without any rectifiers in the output circuit. By using two cores in a bridge configuration, full-wave push-pull output can be obtained.

The flux locking circuit disclosed in the aforesaid copending application has several practical disadvantages. It is very difficult to obtain a half-wave control source which has a low enough impedance to effectively short the control windings and lock the flux. Consequently, it is very difficult to obtain balanced output on both half-cycles. Also, power required to produce a short circuit across the core is equal to the power delivered to the load during that half-cycle so that the input stage, which must contain rectifiers, still must have half the power handling capacity of the output stage.

The general purpose of this invention is to provide a magnetic amplifier which produces an output into the load on both half-cycles of the carrier power supply voltage when the input signal is applied only on alternate half-cycles of the carrier supply voltage. In other words, the present invention provides a magnetic amplifier arrangement which produces a full-wave output from a half-wave input. The use of such an amplifier would enable a combination of half-wave and full-wave amplifier operation in such a manner that the advantages of each could be utilized.

In accordance with the present invention, the circuit which will most easily accomplish this task is simply another half-wave magnetic amplifier stage slaved to the output stage. The present invention contemplates the provision of a half-wave magnetic amplifier driver stage and a half-wave magnetic amplifier slave stage having a common load. The input to the half-wave driver stage is amplified and fed to the load. This amplified signal is also used as an input to the slave half-wave stage which in turn produces a like output to the load on the next half-cycle. The method of utilizing the output of the driver stage to control the slave stage and thus produce the desired full-wave output is very simple and can be accomplished in several ways as will subsequently become more apparent.

An important object of this invention is to provide a new and improved magnetic amplifier of the full-wave output type.

Another object is to provide a magnetic amplifier of the full-wave output type which retains the characteristics of a half-wave magnetic amplifier.

A further object of this invention is to provide a magnetic amplifier of the full-wave output type which has high gain, a high inherent speed of response, and inherent demodulation.

A still another object of the invention resides in the provision of a half-wave magnetic amplifier arrangement having a full-wave output signal.

Another further object is to provide a full-wave magnetic amplifier output stage having half-wave magnetic amplifier characteristics.

Another object of the invention is the provision of a magnetic amplifier control system which produces a full-wave current output and still retains the high speed of response and demodulation of a half-wave magnetic amplifier.

An important object of the invention is the provision of a magnetic amplifier which produces an output into the load in both half-cycles of the carrier power supply voltage when the input is applied only on alternate half-cycles of the carrier supply voltage.

A still another object is to provide a pair of amplifier stages having a common load circuit and being so interconnected as to apply output to the load circuit on alternate half-cycles of the alternating current operating voltage for the two stages.

A still further object of the invention is to provide a method of producing full-wave output from half-wave magnetic amplifiers.

Another further object is to provide a method of utilizing the output of a half-wave magnetic amplifier to control another half-wave magnetic amplifier having a common load circuit whereby the amplifiers deliver power to the load on alternate half-cycles.

A primary object of the present invention is the provision of a half-wave magnetic amplifier slave stage which delivers to the load circuit an output which has the same value as that delivered by a half-wave magnetic amplifier driver stage to the same load on the preceding half-cycle of the supply voltage.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 4 shows the schematic of both the slave and driver half-wave bridge stages with the rectifiers of the slave stage shunted;

Fig. 5 is a modification of Fig. 4 utilizing control windings for intercoupling the two stages;

Figure 1:
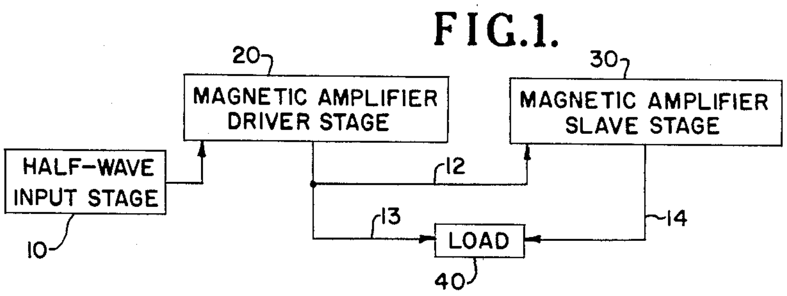
Fig. 1 is a block diagram illustrating the general concept of the invention.

Referring now to the drawings wherein like reference characters designate like or corresponding parts throughout the several figures, there is shown in Fig. 1, which illustrates in block diagram the general concept of the invention, a magnetic amplifier output circuit arrangement consisting of a half-wave magnetic amplifier driver stage 20 and a half-wave magnetic amplifier slave stage 30 whose outputs feed a common load 40 through conductors 13 and 14, respectively. The driver stage 20 is controlled in a conventional manner from a half-wave input signal source 10 such as another half-wave magnetic amplifier stage, or an A.-C. operated vacuum tube circuit, or a transistor amplifier. As in all half-wave magnetic amplifiers, however, this input may be full-wave if this should be the first stage or were driven by a D.-C. operated vacuum tube or transistor amplifier. The magnetic amplifier stages 20 and 30 may be any one of many half-wave magnetic amplifier arrangements known to those skilled in the art of which several are described and illustrated herein. It is to be understood that the invention may be practiced by half-wave magnetic amplifier arrangements other than those described and illustrated herein without departing from the spirit and scope of the invention.

The driver stage 20 and slave stage 30 are so interconnected that each will deliver power to the load 40 on alternate half-cycles of the carrier supply voltage as will hereinafter become more fully apparent. Since control is established in a magnetic amplifier on the half-cycle preceding the one in which power is delivered, part of the output of the driver stage 20 is applied to the slave stage 30 through conductor 12 to establish control of the slave stage 30 which in turn delivers power on the succeeding half-cycle. The cascading of half-wave stages in this manner is conventional except that, heretofore, all of the output of the first or driver stage was used to establish control of the last stage, which was the only stage delivering half-wave output to the load. Since the output of the present invention is full-wave, it may be connected to give an alternating current without any direct current component for driving motors or A.-C. actuated components where the direct component may be undesirable, or may be connected to give direct current output which can be utilized to drive D.-C. motors, D.-C. actuated components or a subsequent full-wave amplifier where control current must be present in every half-cycle. It may also be employed with a D.-C. load which requires or is desirable to have a higher ripple frequency than is attainable from conventional half-wave amplifiers. The half-wave input characteristic allows the use of half-wave input stages, which have inherent high speed of response and fewer components and which may be utilized with feedback compensation to improve the response of the complete system. Although several different arrangements embodying the concept of the invention are described hereinafter, it is to be understood that the invention may be practiced with arrangements other than those described herein and is not limited to the specific circuit arrangements disclosed herein.

Figure 2A:
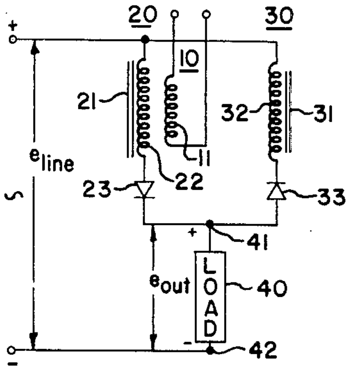
Fig. 2A shows a pair of single-ended half-wave magnetic amplifiers arranged in accordance with the concept of the invention.

Referring now to Fig. 2A, wherein is shown a common load 40 connected to a pair of single-ended half-wave amplifier stages, indicated generally at 20 and 30, the control for the slave stage 30 is derived from the output of the driver stage 20 by utilizing the voltage across the load 40 to establish control on the slave stage 30, the polarities of the potentials indicated being for the half-cycle when control is to be established on the slave stage 30. The half-wave magnetic amplifier driver stage, indicated generally at 20, consists of a self-saturating reactor core 21, preferably of the rectangular hysteresis loop type, having a load winding 22 wound thereon with a rectifier 23 serially connected thereto. Connected in parallel with the driver stage 20 is the half-wave magnetic amplifier slave stage 30 which includes self-saturating reactor core 31, a load winding 32 wound thereon and a rectifier connected in series with the winding 32. The amplifier stages 20 and 30 are energized from an A.-C. source $e_{line}$ and the load 40, common to the outputs of the two half-wave stages is connected between terminals 41 and 42. A half-wave input source 10 applies a control signal to the driver stage 20 by way of control winding 11 wound on core 21. Rectifiers 23 and 33 are so poled with respect to the A.-C. source, as indicated in Fig. 2A, that rectifier 23 passes current whereas rectifier 33 opposes current flow.

In considering the operation of the circuit of Fig. 2A, since the polarity of the line voltage, $e_{line}$, is such that rectifier 33 opposes current flow, and, if we assume that the output from driver stage 20 produces a voltage, $e_{out}$, across load 40, then the voltage across the load winding 32 of core 31 and the series rectifier 33 is equal to $e_{line}-e_{out}$. If the back impedance of rectifier 33 is extremely high, practically all of this voltage appears across it, resulting in little or no effect on the flux setting of core 31 and hence no control. However, if the back impedance of rectifier 33 is low, the voltage is divided between rectifier 33 and winding 32. Furthermore, if the output on the half-cycle shown is high, then the voltage $e_{line}-e_{out}$ appearing across winding 32 and rectifier 33 is low, thereby resulting in a flux setting on core 31 which is not far down the loop; under this condition, core 31 produces an output on the next half-cycle which will be large and of polarity opposite to the output polarity from core 21 during the preceding half-cyle, thereby producing an alternating current across the load 40. If the output is small, the voltage $e_{line}-e_{out}$ approaches $e_{line}$, and the flux of core 31 is reset far down the line with a resultant output on the next half-cycle which is almost cut off. The rectifier of the driver stage 20 must have a high back impedance in order that the output of the slave stage 30 will not affect the driver stage control, since this would produce a positive feedback which adversely affects the speed of response. The reset or bias windings are omitted in all figures for the sake of simplicity to facilitate the explanation and description of the circuitry, and notwithstanding the lack of reset windings in the figures it is to be understood that reset or bias windings are used as necessity dictates.

Figure 2B:
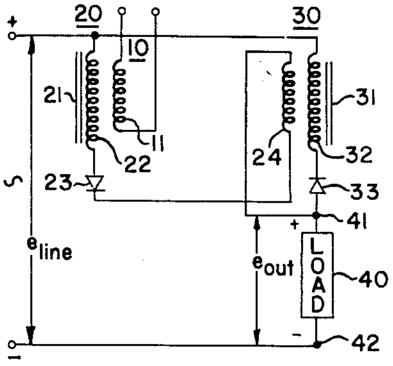
Fig. 2B is a modification of Fig. 2A and employs a control winding in series with one amplifier to control the other amplifier.

If the combination of winding and load impedances is such that an output with no direct current component (i. e. balanced outputs during each half-cycle) can not be achieved by adjusting the back impedance of the slave stage rectifier, control of the slave stage 30 can be established by control windings wound on this stage in series with the output of the driver stage 20. Fig. 2B, which shows such an arrangement schematically, is similar to the circuit arrangement of Fig. 2A, like components having like reference numerals, and includes the addition of a control winding 24 wound on core 31 and connected in series with load winding 22 of core 21 and rectifier 23. With such an arrangement, an alternating load current with no direct current component can be obtained by properly adjusting the control turns, and the slave stage rectifier 33 may additionally be adjusted by shunting to give a combination of the modes of operation. If series control winding 24 is used on the slave stage 30, conventional methods of producing direct load current can be employed.

Figure 3:
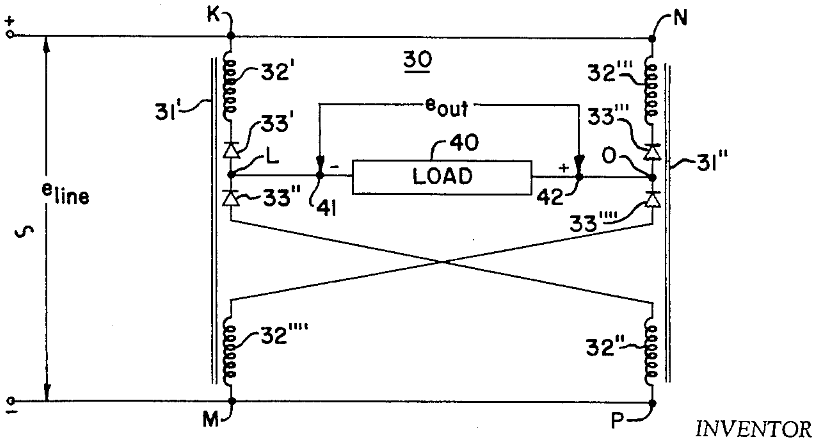
Fig. 3 illustrates the slave stage with conventional half-wave bridge circuitry, controlled with just the voltage across the load produced by the driver stage during the preceding half-cycle.

Reference is now made to Fig. 3 which shows the schematic diagram of the slave stage with half-wave bridge circuitry, controlled with just a voltage across the load produced by the driver stage. It is well known that, in half-wave amplifiers, an alternating voltage appearing across the load during the reset half-cycle of the output stage has a tendency to produce control on that stage if the rectifiers therein did not present a very high back impedance. Thus if the load on the amplifier were reactive, as with a servomotor, and the rectifiers did not have high back impedances or were shunted for reset, the output stage would receive control from the reactive voltage across the motor and continue to produce output for several cycles after the signal was reduced to zero.

Reference to Fig. 3 will show how this control is effected. Fig. 3 illustrates the load circuit of a half-wave bridge output stage during the reset half-cycle when there was an output during the preceding half-cycle and includes a pair of saturable reactor output cores 31' and 31'' having load windings 32', 32'''' and 32'', 32''' respectively wound thereon. Rectifiers 33' and 33'' and 33''', 33'''' are similarly poled and serially connected between windings 32', 32'' and 32''', 32'''', respectively. A load 40 is connected across the ouput of the bridge amplifier at terminals L and O, and an alternating current source, $e_{line}$, is connected to supply operating potential to the half-wave bridge circuit.

With the voltage, $e_{out}$, appearing across the load and the line voltage, $e_{line}$, having the polarity shown in Fig. 3, instead of each load winding and its respective rectifier now having the voltage $$\frac{e_{line}}{2}$$

applied to it (as with a resistive load), the bridge legs KL and OM now have $$\frac{e_{line}+e_{out}}{2}$$

applied to them and the bridge legs NO and LP have the voltage $$\frac{e_{line}-e_{out}}{2}$$

applied thereto. If the rectifiers allow leakage current to flow due to low back impedance thereof, a dividing action takes place as in the single-ended amplifiers of Fig. 2A and 2B, and part of this current is utilized in changing flux in the cores 31' and 31'' to thereby establish control thereof to produce output the next half-cycle independent of any other signal applied to other windings. It will be noted that this control of the slave stage 30 will cause the slave stage to produce on the aforesaid next half-cycle an output current in such a direction as to reverse the polarity shown on the load in Fig. 3. If the load polarity as shown in Fig. 3 were produced by a half-wave bridge magnetic amplifier driver stage connected at L and O, the circuit of Fig. 3 would be a slave stage which would produce in conjunction with the driver stage an alternating current with no control signal other than is applied to the driver stage. Care must be taken that the roles of the slave and driver stages are not reversed on the next half-cycle. In order to prevent this, the driver stage must have rectifiers with very high back impedances in order that feedback from the slave stage will not control it and increase the response times. In order to produce an alternating voltage across the load with no direct current component, it is necessary that the back leakage of the slave stage rectifiers be reduced until the control injected will fire its cores exactly 180° after the respective cores of the driver stage.

Referring now to Fig. 4, there is illustrated the half-wave bridge slave stage and load circuit of Fig. 3 with a half-wave bridge driver stage with a half-wave input control source as suggested in the preceding paragraph. The driver stage 20, in which identical components have substantially equal impedances, as is the case in the half-wave bridge slave stage 30, includes a pair of cores 21' and 21'' having load windings 22', 22'''' and 22''', 22'' respectively wound thereon with rectifiers 23', 23'', 23''', and 23'''' connected thereto to form a conventional half-wave magnetic amplifier bridge circuit. A half-wave input control source 10 applies a control signal to driver stage 20 through control windings 11' and 11'' which are disposed on cores 21' and 21'', respectively.

The slave stage 30 is essentially the same as in Fig. 3, like parts having corresponding reference numerals with rectifiers 33', 33'', 33''' and 33'''' being shunted with resistors 34', 34'', 34''' and 34'''', respectively, to provide the lower back impedance required to obtain an alternating current output with no direct current component. The load 40 is connected across terminals 41 and 42 which are connected to the output terminals C—D and L—O of the driver and slave stages, respectively. The driver and slave stages are energized from an A.-C. source $e_{line}$.

In operation, the driver stage 20 has its control established in one half-cycle of the A.-C. source and fires in the next half-cycle to produce a current flow through load 40 which is correlative to the direction and magnitude of the input signal applied to stage 20 from control source 10. During the aforesaid next half-cycle which is the reset half-cycle of the slave stage 30, the voltage introduced by driver stage 20 and appearing across the load 40 establishes control in slave stage 30, as described above with respect to Fig. 3. The slave stage 30 then fires on the succeeding half-cycle of the A.-C. source to permit a current to flow in load 40 which is equal in magnitude but opposite in polarity to the current flow introduced in load 40 by driver stage 20. Since the firing half-cycle of slave stage 20 is the reset half-cycle of driver stage 30, the driver stage 30 then fires on the next half-cycle to again initiate action on the slave stage 20. In this manner, an alternating current output is produced in a common load circuit from a pair of half-wave magnetic amplifier stages connected to have the output of one amplifier stage provide the flux control for the other amplifier stage in response to a half-wave input control signal applied to only the aforementioned one amplifier stage.

Fig. 5 illustrates another half-wave magnetic amplifier push-pull arrangement embodying the general concept of the invention of utilizing a portion of the output of one half-wave amplifier stage to control the flux setting of a succeeding half-wave amplifier stage to produce a full-wave output from a half-wave input. The arrangement of Fig. 5 employs control windings 24′ and 24″ connected in series with the load 40 across the output terminals C—D of the half-wave bridge amplifier driver stage 20, the control windings 24′ and 24″ being wound on cores 31′ and 31″ of half-wave bridge amplifier slave stage 30.

Since the voltage gain of a half-wave amplifier increases as the number of control winding turns decreases, as is well known to those skilled in the art, the control windings 24′ and 24″ consequently do not require a high number of turns on cores 31′ and 31″. Nevertheless, in order to achieve a high gain by lowering the control winding turns, the control source must have a low driving impedance and must be able to supply the high currents which will flow when maintaining a flux changing voltage across a low number of control winding turns. The driver stage 20, designed to drive the load 40, can supply these high currents easily; and, since only a small voltage is required across the load windings of driver stage 20 to obtain a high gain output from slave stage 30 equal to the driver stage output, very little of the load voltage from driver stage 20 is lost. Moreover, the voltage induced into the slave stage control windings 24′ and 24″ under signal conditions are extremely small. From the foregoing, it is apparent that the unique combination presented in Fig. 5 produces an excellent method of slave stage control. In Fig. 5, the sense of the slave stage control windings are so arranged that the circuit will produce a phase-reversible, alternating-current output.

In the operation of Fig. 5, when the driver stage 20 fires in one half-cycle of the A.-C. source, current, correlative to the half-wave input control signal, flows through control windings 24′ and 24″ and through the load 40 to drive the load circuit. A small portion of the driver stage output voltage is absorbed in resetting the flux in cores 31′ and 31″ during this half-cycle, and subsequently cores 31′ and 31″ fire in the succeeding half-cycle to produce current flow in the load 40 which is equal but opposite in polarity to the current flow produced therein by the driver stage 20. As is apparent, the half-wave stages of Fig. 5 are similar to the half-wave stages of Figs. 3 and 4, like parts having corresponding reference numerals. Fig. 5 omits the resistors across the rectifiers in the slave stage as these are expedients which are optional at the discretion of the designer.

Figure 6:
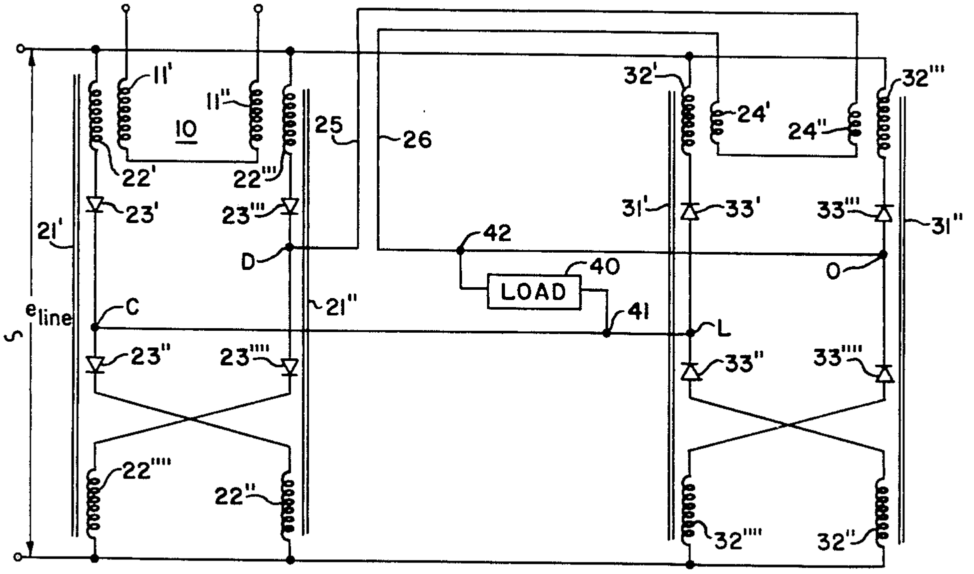
Fig. 6 is a modification of Fig. 5 wherein the control windings have their senses reversed.

Fig. 6 is directed to a push-pull circuit for obtaining a polarity-reversible direct current output. This is attained by employing the circuit of Fig. 5 and reversing the sense of the control windings 24′ and 24″. Also, the rectifiers of both stages must have high back impedances in order to prevent control through the load windings which would produce an alternating current component, which is undesirable in this instance. Otherwise, Fig. 6 is similar in circuitry to Fig. 5.

From an analysis of Figs. 5 and 6, it is seen that a pair of half-wave amplifier stages are connected in cascade to supply a full-wave output to a common load circuit in response to a half-wave input signal applied to one of the stages of which a portion of the output is applied to the second stage to establish flux control thereof.

One disadvantage of the bridge circuit operated directly on a line is that it will not develop full line voltage across the load. With a full-wave bridge it is possible to use a small transformer to increase the motor voltage, even high enough for motors designed for plate-to-plate operation, without danger of saturating the transformer. By center-tapping the transformer, the bridge windings can be simplified to single windings and a full-wave, push-pull amplifier with differential output is obtained. Such an output circuit is shown in Fig. 7.

Figure 7:
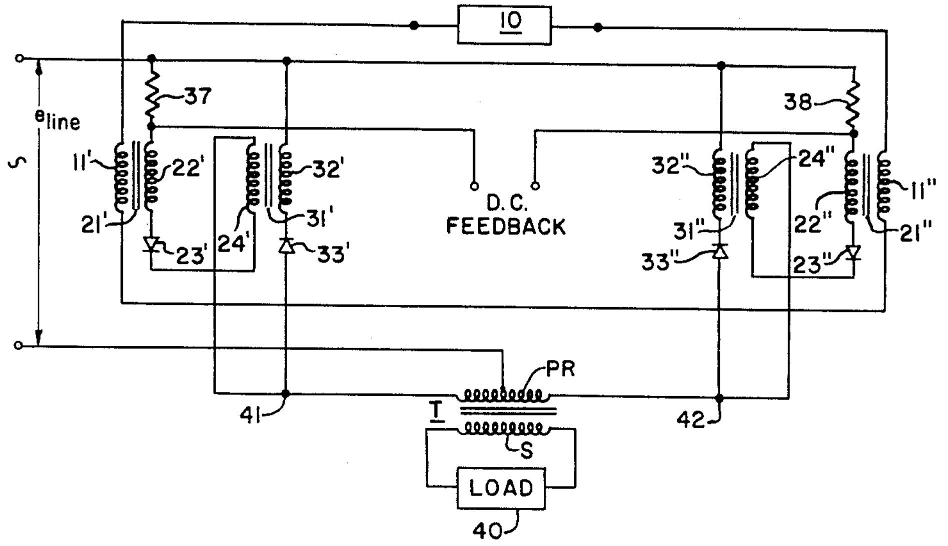
Fig. 7 illustrates a full-wave push-pull magnetic amplifier with a differential output arranged in accordance with the present invention.

Referring now specifically to Fig. 7, there is shown a driver stage consisting of saturable reactor cores 21′ and 21″ having wound thereon control windings 11′ and 11″ to which a half-wave control signal from control source 10 is applied. Cores 21′ and 21″ have wound thereon load windings 22′ and 22″, respectively, to which are, respectively, connected rectifiers 23′ and 23″. The slave stage includes a pair of saturable reactor cores 31′ and 31″ having control windings 24′ and 24″ wound thereon and serially connected to load windings 22′ and 22″, respectively, through rectifiers 23′ and 23″. The load circuit of core 31′ includes load winding 32′ and rectifier 33′ in series across the A. C. energizing source $e_{line}$, and the load circuit of core 31″ consists of load winding 32″ and rectifier 33″ connected in series across the alternating current line source. A center-tapped transformer T has its primary winding PR connected across the amplifier output terminals 41 and 42, the voltage induced in the secondary S being applied to the load 40.

In operation, the cores 21′ and 21″ of Fig. 7 have their flux control established during one half-cycle of the line voltage and fire in the next half cycle in a push-pull manner thereby inducing a voltage in the secondary S of transformer T which voltage is correlative to the input signal from source 10 applied to control windings 11′ and 11″ whereby a voltage of predetermined magnitude and polarity is applied to load 40. During the firing half-cycle of cores 21′ and 21″, the current flowing through control windings 24′ and 24″ establishes control in cores 31′ and 31″, these cores firing in push-pull fashion on the succeeding half-cycle of the line voltage to produce across load 40 a voltage substantially equal in magnitude but opposite in polarity to the voltage applied to the load during the preceding half-cycle by cores 21′ and 21″, thereby resulting in a full-wave output applied to load 40 from a half-wave input signal.

The output transformer T can be a simple center-tapped transformer, as shown, if the motor in load 40 has a 115 volt control winding, or it may be tapped in a different manner for motors with higher or lower voltage control windings. If the motor itself has two 57.5 volt windings or a center-tapped 115 volt winding, it may be used in the circuit of Fig. 7 in lieu of the transformer T, although it is necessary in this case to connect a capacitor across the motor windings in order to obtain full output. Also, the quiescent currents must be set at a level that will not cause excess temperature rise in the motor at zero signal.

The slave stage control windings 24′ and 24″ of Fig. 7 may be modified so as to be differentially wound with respect to each other on cores 31′ and 31″. This results in improved linearity over the use of individually controlled cores, the latter case producing interference with reset windings. With the arrangement of Fig. 7, the number of turns of the control windings required with both 400 and 60 C. P. S. is less than 10. The series resistors 37 and 38 in the driver stage are used to provide a direct voltage for feedback compensation to preceding stages.

Briefly stated in summary, the invention contemplates the provision of a pair of half-wave magnetic amplifier stages so interconnected as to produce a full-wave output across a common load in response to a half-wave control signal applied directly to only one of the amplifier stages whereby the control signal sets the flux level in said one stage during the reset half-cycle thereof. During the succeeding half-cycle, the said one stage fires to produce a voltage across the load of a given polarity, a portion of this voltage being utilized to set the flux level in the other stage by the same amount as that set by the control signal in the said one stage whereby on the next half-cycle the said other stage delivers to the load an output which has the same value as that delivered by the said one stage to the load on the preceding half-cycle. The amplifier stages may be of the single-ended or push-pull type and may have an alternating or direct current output.

In all the figures, the cores of the driver stage should be substantially identical to the cores in the slave stage, both in dimensions and inherent magnetic characteristics. The number of turns of the load windings in the slave stage should be wound to the same specifications as the load winding of the driver stage. The reset or bias windings are omitted in all figures for the sake of simplicity and clarity, but may be employed as necessity dictates, as is well known to the skilled in the art. The cores in all figures are preferably of the rectangular hysteresis loop type.

From the foregoing, it is apparent that the invention provides a versatile magnetic amplifier arrangement which incorporates a combination of half-wave and full-wave amplifier operation in such a manner that the desirable features and advantages of each are utilized.

It is also apparent that, since the output of the present invention is full-wave, it may be connected to deliver an alternating current without any direct current component for driving motors or A. C. actuated components where direct current component may be undesirable, or it may be connected to give direct current output which can be utilized to drive D. C. motors, D. C. actuated components or a subsequent full-wave amplifier where control current must be present in every half-cycle.

Moreover, the invention provides magnetic amplifier arrangements which produce a full-wave current output and yet retain the high speed of response and inherent demodulation of half-wave magnetic amplifiers.

It is further apparent that the invention discloses a general concept of an output producing half-wave stage controlling another output producing half-wave stage in such a manner that a full-wave output is obtained from a half-wave input, the general concept of the invention not being limited to a specific circuit arrangement but being of such universal utility as to be practiced by many magnetic amplifier circuit arrangements of which a few are disclosed herein.

Various modifications are contemplated and may obviously be resorted to by those skilled in the art without departing from the spirit and scope of the invention, as hereinafter defined by the appended claims, as only preferred embodiments have been disclosed.

What is claimed and desired to be secured by Letters Patent of the United States is:

1. A magnetic amplifier arrangement for producing a full-wave output from a half-wave input control signal, comprising a source of alternating current, a first magnetic amplifier stage and a second magnetic amplifier stage so connected to said source as to be alternately conductive on successive half-cycles of said alternating current, a pair of output terminals common to said first and second stages, a load circuit connected across said pair of terminals, and connections to a source of control voltage for applying an input control signal solely to said first stage whereby said first stage delivers to said load an output voltage correlative to said control signal on the conductive half-cycle of said first stage, said first and second stages being so interconnected that the output voltage of said first stage controls the flux setting in said second stage whereby, during the conductive half-cycles of said second stage, said second stage delivers to said load an output voltage which has the same value as that delivered by the first stage on the preceding half-cycles of the alternating current source.

2. The arrangement of claim 1, wherein said connections include control winding means disposed in said first stage.

3. The arrangement of claim 2, wherein each of said stages includes saturable reactor means having load winding means wound thereon and unilateral conductive means connected in series with said load winding means, the unilateral conductive means being so poled that half-wave current flows through each of said stages on alternate half-cycles of said alternating current source.

4. The arrangement of claim 3, wherein the back impedance of the unilateral conductive means in said second stage is low relative to the back impedance of the unilateral conductive means in said first stage.

5. The arrangement of claim 4, wherein each of said first and second stages is a half-wave single-ended amplifier formed by its respective load winding means and its respective unilateral conductive means connected in a series circuit across said alternating current source.

6. The arrangement of claim 5, further including control winding means wound on the reactor means of said second stage and connected in the series circuit of said first stage.

7. The arrangement of claim 6, wherein said control winding means are differentially wound on the reactor means of said second stage.

8. The arrangement of claim 3, wherein each of said first and second stages is a half-wave push-pull bridge amplifier formed by a pair of saturable reactor cores, a pair of load windings on each of said cores, a first branch circuit including in series one load winding of each core with a first pair of similarly poled unilateral conductive devices interposed therebetween, a second branch circuit including in series the other load winding of each core with a second pair of similarly poled unilateral conductive devices interposed therebetween, said first and second branch circuits being connected across said alternating current source and said first and second pairs of devices being poled in the same direction with respect to said source, and circuit means for connecting said pair of output terminals at points between the unilateral conductive devices in each of said branch circuits.

9. The circuit of claim 8, further including a control winding for each core of said second stage, and circuit means for serially connecting said control windings between said points of said first stage.

10. A magnetic amplifier output stage for producing a full-wave output from a half-wave input comprising, in combination, a pair of half-wave magnetic amplifiers connected in cascade, a source of alternating current supplying operating potential to said amplifiers, said amplifiers including means whereby said amplifiers are alternately rendered conductive on successive half-cycles of said alternating current, a load common to said pair of amplifiers, and circuit connections for applying a half-wave input control signal solely to the first of said cascaded pair of amplifiers whereby said first amplifier supplies power to said load during its conductive half-cycles and the other of said amplifiers supplies power selectively under control of the output of said first amplifier to said load during its conductive half-cycles.

11. A magnetic amplifier comprising a half-wave magnetic amplifier driver stage having an output circuit, a half-wave magnetic amplifier slave stage having an output circuit, an alternating current source connected to alternately energize said stages on successive half-cycles thereof, circuit connections for applying a control signal solely to said driver stage, and circuit means including a load connected to the output circuits of said driver and slave stages whereby said stages directly deliver power to said load on alternate half-cycles of said alternating current source in response to the application of a control signal to said driver stage.

12. A full-wave magnetic amplifier having half-wave magnetic amplifier characteristics comprising, in combination, a source of alternating current, a half-wave magnetic amplifier driver stage and a half-wave magnetic amplifier slave stage connected to be alternately conductive on successive half-cycles of said source, means for applying a control signal solely to said driver stage, a pair of output terminals common to said driver and slave stages for receiving the outputs therefrom, a load connected between said terminals, and circuit connections for applying a portion of the output from said driver stage to said slave stage to thereby control the flux setting of said slave stage.

13. A magnetic amplifier output stage for producing a full-wave output from a half-wave input comprising, in combination, an alternating current supply voltage, a pair of reactors each having a load winding thereon, a pair of series branch circuits connected in parallel across said supply voltage, one of said series branch circuits including one of said load windings and a first unidirectional conductive device, the other of said series branch circuits including the other of said load windings and a second unidirectional conductive device, said unidirectional conductive devices being oppositely poled whereby said branch circuits conduct alternately on successive half-cycles of said supply voltage, said second device having a low back impedance relative to the back impedance of said first device, means for applying a half-wave control signal solely to said one branch circuit, and a load circuit connected in series with each of said branch circuits across said supply voltage whereby said pair of branch circuits alternately deliver equal but oppositely poled voltages to said load on successive half-cycles of said supply voltage in response to a control signal applied to said one branch circuit.

14. A magnetic amplifier output stage for producing a full-wave output from a half-wave input comprising, in combination, a source of alternating current; a load circuit; a first branch circuit including a first reactance, first rectifier and said load circuit connected in series across said source; a second branch circuit including a second reactance, a second rectifier and said load circuit connected in series across said source, said second rectifier having a lower back impedance than said first rectifier, said first and second rectifiers being oppositely poled whereby said first and second branch circuits alternately conduct on successive half-cycles of said source; said first reactance being disposed on a first saturable reactor and said second reactance being disposed on a second saturable reactor; and means on said first reactor for applying a control signal solely to said first branch circuit.

15. A claim according to claim 14, further including a control winding on said second reactor connected in series with the elements in said first branch circuit.

References Cited in the file of this patent

UNITED STATES PATENTS 2,169,093 Edwards ________________ Aug. 8, 1939